US011019629B2

(12) United States Patent
Peng

(10) Patent No.: US 11,019,629 B2
(45) Date of Patent: May 25, 2021

(54) DEVICE-TO-DEVICE COMMUNICATION METHOD AND APPARATUS

(71) Applicant: CHINA ACADEMY OF TELECOMMUNICATIONS TECHNOLOGY, Beijing (CN)

(72) Inventor: Ying Peng, Beijing (CN)

(73) Assignee: CHINA ACADEMY OF TELECOMMUNICATIONS TECHNOLOGY, Beijing (CN)

(*) Notice: Subject to any disclaimer, the term of this patent is extended or adjusted under 35 U.S.C. 154(b) by 82 days.

(21) Appl. No.: 15/509,481

(22) PCT Filed: Sep. 2, 2015

(86) PCT No.: PCT/CN2015/088858
§ 371 (c)(1),
(2) Date: Mar. 7, 2017

(87) PCT Pub. No.: WO2016/037542
PCT Pub. Date: Mar. 17, 2016

(65) Prior Publication Data
US 2017/0303260 A1    Oct. 19, 2017

(30) Foreign Application Priority Data
Sep. 12, 2014 (CN) .......................... 201410466271.6

(51) Int. Cl.
*H04W 72/04* (2009.01)
*H04W 72/02* (2009.01)
(Continued)

(52) U.S. Cl.
CPC ..... *H04W 72/048* (2013.01); *H04W 56/0025* (2013.01); *H04W 72/02* (2013.01); *H04W 72/0446* (2013.01); *H04W 76/14* (2018.02)

(58) Field of Classification Search
CPC ... H04W 72/02; H04W 72/04; H04W 72/042; H04W 72/0446; H04W 72/048;
(Continued)

(56) References Cited

U.S. PATENT DOCUMENTS 9,756,672 B2 * 9/2017 Wu ..................... H04W 76/023
9,918,290 B2 * 3/2018 Li .......................... H04W 76/14
(Continued)

FOREIGN PATENT DOCUMENTS

CN    101600242 A    12/2009
CN    103098537 A    5/2013
(Continued)

OTHER PUBLICATIONS

International Search Report for PCT/CN2015/088858 dated Nov. 3, 2015 and its English translation provided by WIPO.
(Continued)

*Primary Examiner* — Andre Tacdiran
(74) *Attorney, Agent, or Firm* — Ladas & Parry, LLP

(57) ABSTRACT

A D2D communication method and a D2D communication apparatus are provided. The method includes: obtaining, by a first UE, a TDD uplink and downlink configuration and a D2D resource configuration strategy for resource configuration in the case that the first UE determines that no cell is detected; allocating, by the first UE, resources for the D2D communication based on the TDD uplink and downlink configuration and the D2D resource configuration strategy; and performing, by the first UE, the D2D communication based on the allocated resources for the D2D communication.

15 Claims, 2 Drawing Sheets

(51) Int. Cl.
*H04W 76/14* (2018.01)
*H04W 56/00* (2009.01)

(58) Field of Classification Search
CPC .............. H04W 56/00; H04W 56/001; H04W 56/002; H04W 56/0025; H04W 76/02; H04W 76/14; H04W 8/005; H04W 92/18; H04W 4/70; H04W 84/18; H04L 1/1614; H04L 5/00; H04L 5/0033; H04L 5/0053
See application file for complete search history.

(56) References Cited

U.S. PATENT DOCUMENTS

| | | | |
|---|---|---|---|
| 10,212,742 B2 * | 2/2019 | Jung | H04W 72/04 |
| 10,368,261 B2 * | 7/2019 | Park | H04W 24/10 |
| 2013/0148566 A1 | 6/2013 | Doppler et al. | |
| 2014/0056220 A1 * | 2/2014 | Poitau | H04W 76/14 370/328 |
| 2014/0334354 A1 * | 11/2014 | Sartori | H04W 8/005 370/280 |
| 2015/0043398 A1 * | 2/2015 | Fwu | H04W 76/10 370/330 |
| 2015/0045016 A1 * | 2/2015 | Xiong | H04W 4/70 455/426.1 |
| 2015/0085715 A1 | 3/2015 | Sun et al. | |
| 2015/0163770 A1 * | 6/2015 | Guo | H04W 72/0426 455/436 |
| 2015/0222401 A1 | 8/2015 | Xu et al. | |
| 2015/0223279 A1 | 8/2015 | Jiao et al. | |
| 2015/0319724 A1 | 11/2015 | Chae et al. | |
| 2015/0319745 A1 * | 11/2015 | Seo | H04W 72/0406 370/329 |
| 2015/0341974 A1 | 11/2015 | Wu et al. | |
| 2016/0021625 A1 * | 1/2016 | Li | H04W 72/1289 370/336 |
| 2016/0037551 A1 * | 2/2016 | Lei | H04W 72/1273 370/280 |
| 2016/0183208 A1 * | 6/2016 | Lee | H04W 76/14 370/350 |
| 2016/0205665 A1 * | 7/2016 | Fukuta | H04W 72/02 455/454 |
| 2016/0302152 A1 * | 10/2016 | Morita | H04W 52/0212 |
| 2016/0338124 A1 * | 11/2016 | Byun | H04W 76/00 |
| 2017/0006585 A1 * | 1/2017 | Jung | H04W 72/042 |
| 2017/0006658 A1 * | 1/2017 | Jung | H04W 76/14 |
| 2017/0027015 A1 * | 1/2017 | Wijesinghe | H04W 72/042 |
| 2017/0041932 A1 * | 2/2017 | Chae | H04W 72/04 |
| 2017/0055233 A1 * | 2/2017 | Takano | H04W 4/70 |
| 2017/0099174 A1 * | 4/2017 | Kim | H04W 76/14 |
| 2017/0150340 A1 * | 5/2017 | Park | H04W 76/14 |
| 2017/0156169 A1 * | 6/2017 | Lakshmi Narayanan | H04W 24/04 |
| 2017/0163470 A1 * | 6/2017 | Seo | H04W 76/14 |
| 2017/0171880 A1 * | 6/2017 | Chae | H04W 72/0413 |
| 2017/0215114 A1 * | 7/2017 | Li | H04W 72/1215 |
| 2017/0230923 A1 * | 8/2017 | Huang | H04W 56/00 |
| 2017/0230926 A1 * | 8/2017 | Seo | H04W 56/0015 |

FOREIGN PATENT DOCUMENTS

| | | |
|---|---|---|
| CN | 103108405 A | 5/2013 |
| CN | 103327628 A | 9/2013 |
| CN | 103582127 A | 2/2014 |
| CN | 103686691 A | 3/2014 |
| CN | 103828398 A | 5/2014 |
| CN | 103906266 A | 7/2014 |
| JP | 2016-504860 | 2/2016 |
| WO | 2014/098522 A1 | 6/2014 |

OTHER PUBLICATIONS

Written Opinion of the International Search Authority for PCT/CN2015/088858 dated Nov. 3, 2015 and its English translation provided by WIPO.
International Preliminary Report on Patentability (IPRP; Ch 1) for PCT/CN2015/088858 dated Mar. 23, 2017 and its English translation provided by WIPO.
From TW Application No. 104129725, Office Action dated Oct. 7, 2016 with English translation provided by foreign associate.
From EP Application No. 15840783.3, Supplementary European Search Report and Search Opinion dated Sep. 13, 2017.
Intel Corporation: "Resource allocation signaling for D2D communication", 3GPP TSG RAN WG2 Meeting #86; R2-142045; 20140519-20140523; Seoul, Korea; May 19-23, 2014.
CATT: "Discussion on D2D synchronization procedure"; 3GPP TSG RAN WG1 Meeting # 77; R 1-142009; 20148519-20140523; Seoul, Korea; May 19-23, 2014.
Alcatel-Lucent et al.: "Mode Configuration and switching", 3GPP TSG-RAN WG2 Meeting # 86; R2-142584; 20140512-20140516; Seoul, Korea; May 12-16, 2014.
Office Action dated May 8, 2018 for Japanese Patent Application No. 2017-513418 and its English translation provide by Applicant's foreign council.
CATT: "Considerations on D2D synchronization procedure", 7.2.3.3.3. 3GPP TSG RAN WG1 Meeting #78, Dresden, Germany, Aug. 18-22, 2014, R1-142895.
Communication pursuant to Article 94(3) EPC from EP app. No. 15840783.3, dated Jun. 17, 2020.
"Discussion on D2D Synchronization Procedure", R1-142935, 3GPP TSG RAN WG1 Meeting #78, Dresden, Germany, Aug. 18-22, 2014.
"Mode Selection and Resource Pool Selection for D2D UEs", R2-141695, 3GPP TSG-RAN WG2 #85bis, Valencia, Spain, Mar. 31-Apr. 4, 2014.

* cited by examiner

DEVICE-TO-DEVICE COMMUNICATION METHOD AND APPARATUS

CROSS REFERENCE TO RELATED APPLICATIONS

The present application is the U.S. national phase of PCT Application PCT/CN2015/088858 filed on Sep. 2, 2015, which claims the priority of to Chinese patent application No. 201410466271.6 filed on Sep. 12, 2014, the disclosure of which are incorporated herein by reference in their entireties.

TECHNICAL FIELD

The present disclosure relates to the field of mobile communication technology, in particular to a Device-to-Device (D2D) communication method and a D2D apparatus.

BACKGROUND

In a cellular communication system in the related art, services such as voice and data are communicated between two User Equipments (UEs) through base stations where the two UEs camp on respectively and a core network. The communication between the two UEs may be implemented by a D2D technique when these two UEs are adjacent to each other. In the D2D technique, the adjacent UEs may communicate data with each other by a direct link at a close range without a central node configured forwarding the data.

The D2D technique has following advantages due to its characteristics of short-distance and direct communication: the D2D commutation may be at high rate, low latency and low power consumption; spectrum resources may be utilized efficiently since the UEs are widely distributed in a communication network and a length of the D2D communication link is short; a demand for sharing local data may be met due to the direct link of the D2D communication, so as to provide the data service with high flexibility; and the D2D direct communication may utilize the numerous UEs widely distributed in the network to expand a coverage area of the network.

In a Long Term Evolution (LIE) network, the D2D communication operates in a licensed spectrum band of the LTE network and controlled by the LTE network. Thus, the D2D communication may give full play to its advantages, and deficiencies of the D2D communication in the related art such as an uncontrollable interference may be overcome by the LTE network controlling the D2D communication.

There are three scenarios for the UEs in the D2D communication, i.e. the UEs are within a network coverage, the UEs are outside the network coverage, and the UEs are partially within the network coverage. FIG. 1 shows the scenario where the UEs are within the network coverage; FIG. 2 shows the scenario where the UEs are outside the network; and FIG. 3 shows the scenario where the UEs are partially within the network coverage.

In a Frequency Division Duplexing (FDD) system, the D2D communication operates merely on an uplink carrier; and in a Time Division Duplexing (TDD) system, the D2D communication merely uses an uplink sub-frame when the UEs operate within the network coverage. As a result, during the D2D communication of the UEs, it is prevented from interfering an existing mobile network and co-ordinates a use of the spectrum resources.

For the scenario where the UEs operate outside the network and the scenario where the UEs operate partially within the network coverage, there has been no solution for the UEs to determine the D2D resources to be used on the TDD carrier in the D2D communication until now.

SUMMARY

The present disclosure provides a D2D communication method and a D2D communication apparatus, so as to determine the D2D resources to be used on the TDD carrier in the D2D communication when at least one of the UEs operates outside the network.

In one aspect, the present disclosure provides a D2D communication method for D2D communication by using an authorized TDD carrier, including: obtaining, by a first UE, a TDD uplink and downlink configuration and a D2D resource configuration strategy for resource configuration when the first UE determines that no cell has been detected; allocating, by the first UE, resources for the D2D communication based on the TDD uplink and downlink configuration and the D2D resource configuration strategy; and performing, by the first UE, the D2D communication based on the allocated resources for the D2D communication.

In another aspect, the present disclosure provides a D2D communication apparatus for D2D communication by using an authorized TDD carrier, including: an obtaining unit configured to obtain a TDD uplink and downlink configuration and a D2D resource configuration strategy for resource configuration when the a first UE determines that no cell has been detected; a D2D resource allocating unit configured to allocate resources for the D2D communication based on the TDD uplink and downlink configuration and the D2D resource configuration strategy; and a communication unit configured to perform the D2D communication based on the allocated resources for the D2D communication.

In yet another aspect, the present disclosure provides a D2D communication apparatus including: a processor; a memory connected to the processor via a bus interface and configured to store therein programs and data for the operation of the processor. When the programs and data stored in the memory are called and executed by the processor, the processor is configured to achieve the functions of: an obtaining unit configured to obtain a TDD uplink and downlink configuration and a D2D resource configuration strategy for resource configuration when the a first UE determines that no cell has been detected; a D2D resource allocating unit configured to allocate resources for the D2D communication based on the TDD uplink and downlink configuration and the D2D resource configuration strategy; and a communication unit configured to perform the D2D communication based on the allocated resources for the D2D communication.

According to the present disclosure, when the UE determines that no cell has been detected, the UE obtains the D2D resource configuration strategy preconfigured for the UE. Through the above method, a UE outside the network coverage may determine a type of a frame structure on the TDD carrier for the communication of the UE. In addition, it enables to ensure an efficiency of the D2D communication to a certain extent and reduce a collision probability of resource competition without interfering the TDD system.

DETAILED DESCRIPTION

In order to make the objects, the technical solutions and the advantages of the present disclosure more apparent, the present disclosure will be described hereinafter in details in conjunction with the drawings. Obviously, the following embodiments merely relate to a part of, rather than all of, the embodiments of the present disclosure. Based on these embodiments, a person skilled in the art may, without any creative effort, obtain the other embodiments, which also fall within the scope of the present disclosure.

The embodiment of the present disclosure will be described in details hereinafter in conjunction with the drawings.

The present disclosure provides in some embodiments the D2D communication method and the D2D communication apparatus for the D2D communication by using the authorized TDD carrier. The authorized TDD carrier is a carrier on a licensed spectrum band of the TDD system. It should be noted that, in the present disclosure, a synchronization signal may represent a synchronization signal in a narrow sense or a synchronization signal in a broad sense. Specifically, the synchronization signal in the narrow sense may be the synchronization signal itself, while the synchronization signal in the broad sense may include the synchronization signal and a synchronization channel including D2D resource configuration strategy of the synchronization signal such as priority identification and a TDD uplink and downlink configuration.

Figure 1:
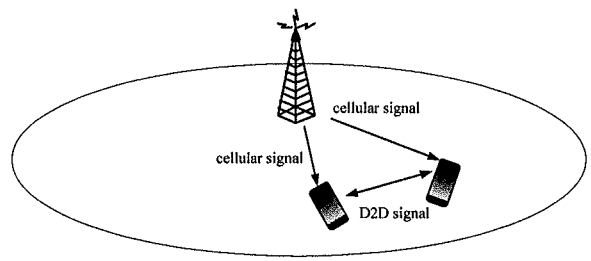
FIG. 1 is a schematic diagram showing a scenario where the UEs are within a network coverage.
Figure 2:
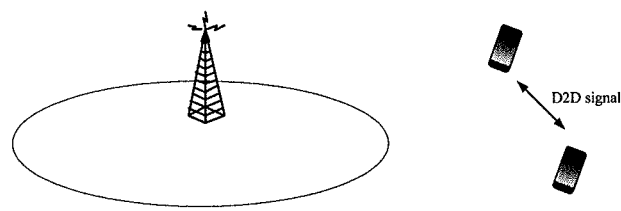
FIG. 2 is a schematic diagram showing a scenario where the UEs are outside the network coverage.
Figure 3:
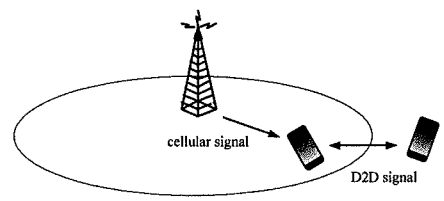
FIG. 3 is a schematic diagram showing a scenario where the UEs are partially within the network coverage.
Figure 4:
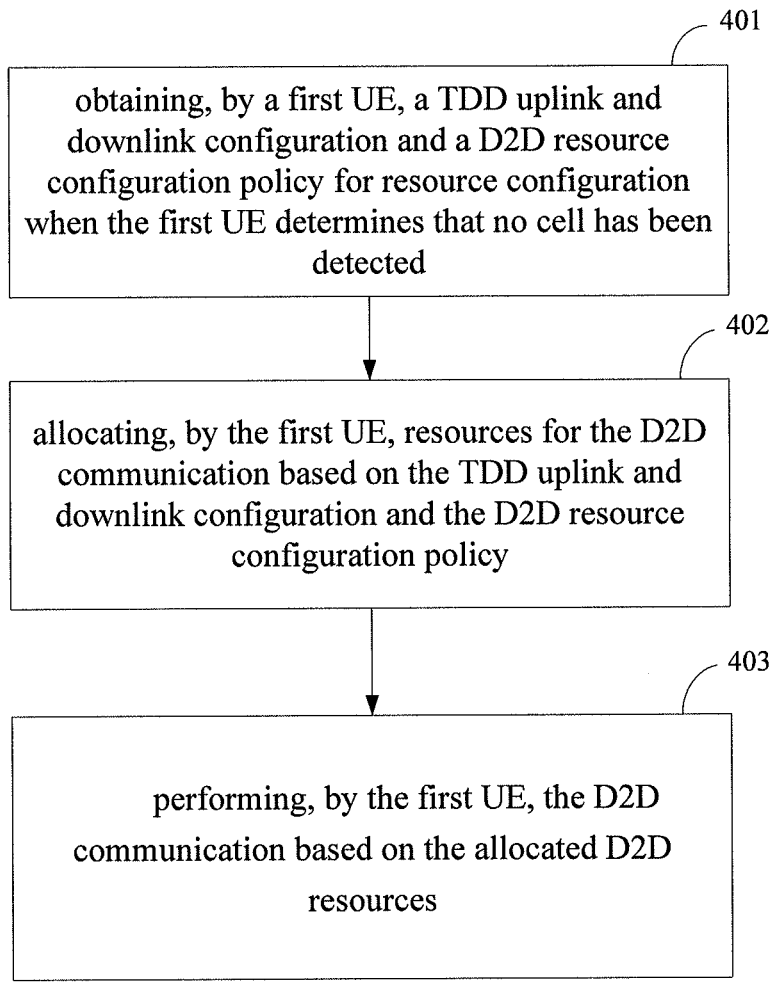
FIG. 4 is a flow chart showing a D2D communication method in some embodiments of the present disclosure.

As shown in FIG. 4, which is a flowchart for the D2D communication method, the method includes: a step 401 of obtaining, by a first UE, TDD uplink and downlink configuration and a D2D resource configuration strategy for resource configuration when the first UE determines that no cell is detected.

There may be a plurality of scenarios for the case that the first UE determines that no cell is detected, including that the first UE determines that no cell is detected and the first UE does not receive a synchronization signal transmitted by a second UE; or the first UE determines that no cell is been detected, the first UE receives the synchronization signal transmitted by the second UE, and a priority of a synchronization signal transmitted by the first UE is higher than that of the synchronization signal transmitted by the second UE; or the first UE determines that no cell is detected, the first UE receives the synchronization signal transmitted by the second UE, and the priority of the synchronization signal transmitted by the second UE is higher than that of the synchronization signal transmitted by the first UE.

For each of the above scenarios, there are different methods for obtaining the TDD uplink and downlink configuration for the resource allocation and the D2D resource configuration strategy for the resource configuration. In particular, when the first UE determines that no cell is detected, and the first UE does not receive a synchronization signal transmitted by a second UE, or when the first UE determines that no cell is detected, the first UE receives the synchronization signal transmitted by the second UE, and a priority of a synchronization signal transmitted by the first UE is higher than that of the synchronization signal transmitted by the second UE, the obtaining the TDD uplink and downlink configuration and D2D resource configuration strategy for the resource configuration includes: obtaining the TDD uplink and downlink configuration preconfigured for the first UE and the D2D resource configuration strategy preconfigured for the first UE. When the first UE determines that no cell is detected, the first UE receives the synchronization signal transmitted by the second UE within a first predetermined time period, and the priority of the synchronization signal transmitted by the second UE is higher than that of the synchronization signal transmitted by the first UE, the obtaining the TDD uplink and downlink configuration and D2D resource configuration strategy for the resource configuration includes: using the TDD uplink and downlink configuration and the D2D resource configuration strategy of the second UE as the TDD uplink and downlink configuration and the D2D resource configuration strategy for the resource configuration.

In addition, the method further includes: a step 402 of allocating, by the first UE, resources for the D2D communication based on the TDD uplink and downlink configuration and the D2D resource configuration strategy.

In addition, the method further includes: a step 403 of performing, by the first UE, the D2D communication based on on the allocated resources for the D2D communication.

In the above step 401, the cell is a cell of a cellular system including a TDD system and/or a FDD system. If the first UE does not detect a cell of any cellular system, the first UE may be in the scenario where the UEs are outside the network coverage, or in the scenario where the UEs are partially within the network coverage.

For example, when the first UE does not detect a cell of any cellular system within a predetermined time period after the first UE is powered on, it is indicated that the first UE is in the a scenario where the UEs are outside the network coverage; in other words, the first UE is deemed to be incapable of accessing any cellular system. The predetermined time period is a period where the first UE keeps searching for a cell of a cellular system after the first UE is powered up or restarted.

For another example, when the first UE camps on in a cell of a cellular system and is out of synchronization with the cell and has not detected a cell of any other cellular system within the predetermined time period, it is indicated that the first UE is in the scenario wherein the UEs are partially within the network coverage.

To be specific, when the first UE is in the scenario where the UEs are outside the network coverage or the scenario where the UEs are partially within the network coverage, and the first UE does not receive the synchronization signal transmitted by the second UE, the first UE may allocate the D2D resources by using the TDD uplink and downlink configuration preconfigured for the first UE and the D2D resource configuration strategy preconfigured for the first UE, and transmit the D2D signal based on the allocated D2D resources. In the above procedure, another procedure of receiving the D2D signal may be continued.

Optionally, when the first UE is within the scenario where the UEs are outside the network coverage or the scenario where the UEs are partially within the network overage, the first UE receives the synchronization signal transmitted by the second UE, where a priority of the synchronization signal transmitted by the first UE is higher than that of the synchronization signal transmitted by the second UE, the first UE may allocate the D2D resources by using the TDD uplink and downlink configuration preconfigured for the first UE and the D2D resource configuration strategy preconfigured for the first UE, and then transmit the D2D signal based on the allocated D2D resources. In the above procedure, another procedure of receiving the D2D signal may be continued.

Optionally, when the first UE is within the scenario where the UEs are outside the network coverage or the scenario where the UEs are partially within the network overage, the first UE receives the synchronization signal transmitted by the second UE, where a priority of the synchronization signal transmitted by the second UE is higher than that of the synchronization signal transmitted by the first UE, the first UE may allocate the D2D resources by using the TDD uplink and downlink configuration of the second UE and the D2D resource configuration strategy of the second UE, and then transmit the D2D signal based on the allocated D2D resources.

In the above procedure, the D2D resource configuration strategy preconfigured for the first UE may include a transmitting sub-frame time pattern. The transmitting sub-frame time pattern may be determined based on the preconfigured TDD uplink and downlink configuration. The TDD uplink and downlink configuration may indicate a configuration ratio of the uplink sub-frame and the downlink sub-frame, e.g. which sub-frames are used for the uplink transmission, which sub-frames are used for the downlink transmission, and the TDD uplink and downlink configuration may include uplink and downlink configuration modes 0-7.

The transmitting sub-frame time pattern may be identified in an indexing manner. A range of the indexing values may not extend beyond 128, and each of the indexing values is mapped to a transmitting sub-frame time pattern. The transmitting sub-frame time pattern is a bitmap with a length of N, and each bit corresponds to one sub-frame, wherein a sub-frame corresponding to "1" in the bitmap represents a transmitting sub-frame of the D2D signal, and a sub-frame corresponding to "0" in the bitmap represents that the D2D signal is not transmitted in the sub-frame. A number of transmitting opportunities of the transmitting sub-frame time pattern is represented by k. Furthermore, a value of the length N representing the transmitting sub-frame time pattern and a value of the number k of the transmitting opportunities may be included in the preconfigured D2D resource configuration strategy.

A value of k may be selected from a range of {1, 2, 4, 8}. For the TDD system, there may be different values of the length N for different TDD uplink and downlink configurations. For example, when the uplink and downlink configuration is of a mode 0, a value of the length N is 7; when the uplink and downlink configuration is of a mode 1, 2, 4 or 5, a value of the length N is 8; and when the uplink and downlink configuration is of a mode 3 or 6, a value of the length N is 6.

Furthermore, the TDD uplink and downlink configuration may be preconfigured for the first UE. The TDD uplink and downlink configuration preconfigured for the first UE may be determined based on a D2D protocol supported by the first UE and the TDD uplink and downlink configuration that is in Public Land Mobile Network (PLMN) and used by the first UE. Alternatively, it may be preconfigured a fixed TDD uplink and downlink configuration, e.g. the TDD uplink and downlink configuration of the mode 0, in which sub-frames 0, 1, 5 and 6 are downlink or special sub-frames.

The above procedure is applied to the scenario where the UEs are outside the network coverage. In such scenario, it is considered that the D2D communication of the first UE may not interfere with the cellular system. As a result, the first UE may perform the D2D communication in the uplink sub-frames and the downlink sub-frames based on the D2D resource configuration strategy preconfigured for the first UE. Optionally, the first UE may perform the D2D communication by using consecutive sub-frames including the uplink sub-frames and the downlink sub-frames in the TDD uplink and downlink configuration, thereby improving a resource utilization ratio of the D2D communication and reducing the collision probability of resource competition.

In the step 402, the first UE may determine the transmitting sub-frame time pattern indicating the transmitting sub-frames used in the D2D communication based on the TDD uplink and downlink configuration and the D2D resource configuration strategy. The first UE may determine transmitting resources of the D2D communication based on the transmitting sub-frame time pattern.

Furthermore, in the TDD, when the first UE operates within the network coverage, the D2D resource configuration strategy indicates that the first UE may use merely the uplink sub-frames; and when the first UE operates outside the network coverage, the D2D resource configuration strategy indicates that the first UE may use the consecutive sub-frames including the uplink sub-frames and the downlink sub-frames in the TDD uplink and downlink configuration.

Furthermore, the TDD uplink and downlink configuration preconfigured for the first UE may be modified as needed.

The above are the procedures of the D2D resource allocation and the D2D transmission in the scenario where the UEs are outside the network coverage. However, since the UEs are movable and an environment of the network is complex, the present disclosure provides in some embodiments following solutions for switching among different scenarios. Hereafter, it is described cases for switching among different scenarios.

In a first case, the first UE is in the scenario where the UEs are outside the network coverage, and the first UE receives the synchronization signal with the high priority transmitted by the second UE.

In such scenario, the first UE may stop a current transmission of a D2D signal and stop performing the transmission by using the TDD uplink and downlink configuration information preconfigured for the first UE and the D2D resource configuration strategy preconfigured for the first UE, allocate the D2D resources by using the TDD uplink and downlink configuration of the second UE and the D2D resource configuration strategy of the second UE, and then transmit the D2D signal based on the allocated D2D resources. In the above procedure, another procedure of receiving the D2D signal may be continued.

The first UE may obtain the TDD uplink and downlink configuration of the second UE and the D2D resource configuration strategy of the second UE from the signal transmitted by the second UE. The meanings of the TDD uplink and downlink configuration and the D2D resource configuration strategy are described above, and the detailed description thereof is omitted herein. For saving the network overhead, the second UE may transmit an index of the transmitting sub-frame time pattern, so that the first UE may obtain a corresponding transmitting sub-frame time pattern.

In a second case, when the first UE are in the scenario where the UEs are outside the network coverage, the first UE detected the cell at a TDD frequency point authorized for the D2D communication and the first UE camps on the cell.

In such scenario, the first UE stops a current transmission of a D2D signal, stops performing the transmission by using the TDD uplink and downlink configuration information preconfigured for the first UE and the D2D resource configuration strategy preconfigured for the first UE, allocates resources for the D2D communication based on the TDD uplink and downlink configuration of the cell where the first UE camps on and a D2D resource pool obtained from a system message broadcasted by the cell, and transmitting the D2D signal based on the allocated D2D resources.

For example, in this scenario, the first UE determines the TDD uplink and downlink configuration of the cell, and obtains the D2D resource pool from the system message broadcasted by the cell. The first UE performs the D2D communication by using the TDD uplink and downlink configuration of the cell, and allocates the D2D resources based on the D2D resource pool of the cell.

In a third case, the first UE is out of synchronization in a first cell where the first UE camps on, and the first UE detects a second cell at the TDD frequency point authorized for the D2D communication within a predetermined time period and the first UE camps on the second cell.

In this case, the first UE stops a current transmission of a D2D signal, stops performing the transmission by using the TDD uplink and downlink configuration information preconfigured for the first UE and the D2D resource configuration strategy preconfigured for the first UE, allocates resources for the D2D communication based on the TDD uplink and downlink configuration of the second cell and a D2D resource pool obtained from a system message broadcasted by the cell, and transmits the D2D signal based on the allocated D2D resources.

For example, the first UE determines the TDD uplink and downlink configuration of the second cell, and obtains the D2D resource pool from the system message broadcasted by the second cell. The first UE performs the D2D communication by using the TDD uplink and downlink configuration of the second cell, and allocates the D2D resources based on the D2D resource pool of the second cell.

In a fourth case, the first UE is out of synchronization in the cell where the first UE camps on, the first UE does not detect any other cell within a second predetermined time period, and the first UE receives a synchronization signal transmitted by the third UE at the TDD frequency point authorized for the D2D communication.

In this case, the first UE may stop a current transmission of a D2D signal and stop performing the transmission by using the TDD uplink and downlink configuration information preconfigured for the first UE and the D2D resource configuration strategy preconfigured for the first UE, allocate resources for the D2D communication by using the TDD uplink and downlink configuration and the D2D resource configuration strategy of the third UE, and transmit the D2D signal based on the allocated D2D resources.

The first UE may obtain the TDD uplink and downlink configuration of the third UE and the D2D resource configuration strategy of the third UE from the signal transmitted by the third UE. The meanings of the TDD uplink and downlink configuration and the D2D resource configuration strategy have been described above, which will not be repeated herein. For saving the network overhead, the third UE may transmit an index of the transmitting sub-frame time pattern, so that the first UE may obtain a corresponding transmitting sub-frame time pattern.

In a fifth case, the first UE is out of synchronization in the cell where the first UE camps on, the first UE does not detect any other cell within the second predetermined time period, and the first UE does not receive a synchronization signal transmitted by the third UE at the TDD frequency point authorized for the D2D communication In this case, subsequent to a third predetermined time period, the first UE may allocate resources for the D2D communication based on the TDD uplink and downlink configuration preconfigured for the first UE and the D2D resource configuration strategy preconfigured for the first UE, and transmit the D2D signal based on the allocated D2D resources. FIG. 4 shows a flow chart for this procedure. Corresponding to the above procedures, the present disclosure further provides a D2D communication apparatus. For details of the D2D communication apparatus, it may refer to the above method embodiments, which is not repeated herein.

Figure 5:
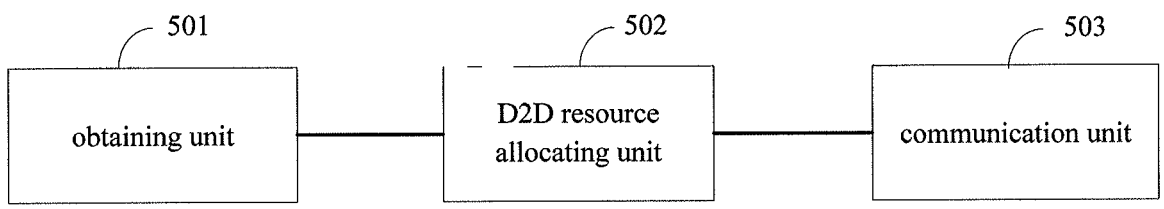
FIG. 5 is a block diagram showing a D2D communication apparatus in some embodiments of the present disclosure.

As shown in FIG. 5 showing a D2D communication apparatus, the present disclosure provides in some embodiments a D2D communication apparatus for D2D communication by using an authorized TDD carrier. The D2D communication apparatus includes:

an obtaining unit 501 configured to obtain TDD uplink and downlink configuration and a D2D resource configuration strategy for resource configuration when the a first UE determines that no cell is detected; and a D2D resource allocating unit 502 configured to allocate resources for the D2D communication based on the TDD uplink and downlink configuration and the D2D resource configuration strategy; and a communication unit 503 configured to perform the D2D communication based on the allocated resources for the D2D communication.

Optionally, the obtaining unit 501 is configured to obtain the TDD uplink and downlink configuration preconfigured for the first UE and the D2D resource configuration strategy preconfigured for the first UE, when the first UE determines that no cell is detected and the first UE does not receive a synchronization signal transmitted by a second UE. Alternatively, the obtaining unit 501 is configured to obtain the TDD uplink and downlink configuration preconfigured for the first UE and the D2D resource configuration strategy preconfigured for the first UE, when the first UE determines that no cell is detected, the first UE receives the synchronization signal transmitted by the second UE, and a priority of a synchronization signal transmitted by the first UE is higher than that of the synchronization signal transmitted by the second UE. Alternatively, the obtaining unit 501 is configured to stop by the first UE a current transmission of a D2D signal and stop by the first UE performing the transmission by using the TDD uplink and downlink configuration information preconfigured for the first UE and the D2D resource configuration strategy preconfigured for the first UE, and use the TDD uplink and downlink configuration and the D2D resource configuration strategy of the second UE as the TDD uplink and downlink configuration and the D2D resource configuration strategy for the resource configuration, when the first UE determines that no cell is detected, the first UE receives the synchronization signal transmitted by the second UE within a first predetermined time period, and the priority of the synchronization signal transmitted by the second UE is higher than that of the synchronization signal transmitted by the first UE.

Optionally, the D2D resource allocating unit 502 is configured to:

determine, by the first UE, a transmitting sub-frame time pattern indicating the transmitting sub-frame for the D2D communication based on the TDD uplink and downlink configuration and the D2D resource configuration strategy; and determine, by the first UE, transmitting resources for the D2D communication based on the transmitting sub-frame time pattern.

Alternatively, the communication unit 503 is further configured to:

stop, by the first UE, the current transmission of the D2D signal, and stop, by the first UE, performing the transmission by using the TDD uplink and downlink configuration information preconfigured for the first UE and the D2D resource configuration strategy preconfigured for the first UE, when the first UE detects the cell at a TDD frequency point authorized for the D2D communication and the first UE camps on the cell after the first UE performs the D2D communication based on the allocated D2D resources; and allocate resources for the D2D communication based on the TDD uplink and downlink configuration of the cell where the first UE camps on and a D2D resource pool obtained from a system message broadcasted by the cell, and transmit, by the first UE, the D2D signal based on the allocated D2D resources.

Alternatively, the communication unit 503 is further configured to:

stop, by the first UE, the current transmission of the D2D signal, and stop, by the first UE, performing the transmission by using the TDD uplink and downlink configuration for the first UE and the D2D resource configuration strategy preconfigured for the first UE, when the first UE is out of synchronization in a first cell where the first UE camps on, the first UE detects a second cell at the TDD frequency point authorized for the D2D communication in a second predetermined time period and the first UE camps on the second cell; and allocate resources for the D2D communication based on the TDD uplink and downlink configuration of the second cell and a D2D resource pool obtained from a system message broadcasted by the cell, and transmit, by the first UE, the D2D signal based on the allocated D2D resources.

Alternatively, the communication unit 503 is further configured to: stop, by the first UE, the current transmission of the D2D signal and stop, by the first UE, performing the transmission by using the TDD uplink and downlink configuration information preconfigured for the first UE and the D2D resource configuration strategy preconfigured for the first UE, allocate, by the first UE, resources for the D2D communication by using the TDD uplink and downlink configuration and the D2D resource configuration strategy of a third UE, and transmit, by the first UE, the D2D signal based on the allocated D2D resources, when the first UE is out of synchronization in the cell where the first UE camps on, the first UE does not detect any other cell in a second predetermined time period, and the first UE receives a synchronization signal transmitted by the third UE at the TDD frequency point authorized for the D2D communication.

Alternatively, the communication unit 503 is further configured to:

allocate, by the first UE, resources for the D2D communication based on the TDD uplink and downlink configuration and the D2D resource configuration strategy preconfigured for the first UE, and perform, by the first UE, the D2D communication based on the allocated D2D resources after a third predetermined time period, when the first UE is out of synchronization in the cell where the first UE camps on, the first UE does not detect any other cell in a second predetermined time period, and the first UE does not receive a synchronization signal transmitted by the third UE at the TDD frequency point authorized for the D2D communication.

Based on the method in the embodiments of the present disclosure, the UE may obtain the TDD uplink and downlink configuration preconfigured for the UE and the D2D resource configuration strategy preconfigured for the UE, when the UE determines that no cell is detected and the UE does not receive a synchronization signal transmitted by any other UE; Through the above method, a UE outside the network coverage may determine a type of a frame structure on the TDD carrier for the communication of the UE. In addition, it enables to ensure an efficiency of the D2D communication to a certain extent and reduce a collision probability of resource competition without interfering the TDD system.

The present disclosure has been described with reference to the flow charts and/or block diagrams of the method, device (system) and computer program product based on the embodiments of the present disclosure. It should be understood that computer program instructions may be used to implement each of the work flows and/or blocks in the flow charts and/or the block diagrams, and the combination of the work flows and/or blocks in the flow charts and/or the block diagrams. These computer program instructions may be provided to a processor of a common computer, a dedicate computer, an embedded processor or any other programmable data processing devices to create a machine, so that instructions executable by the processor of the computer or the other programmable data processing devices may create a device to achieve the functions assigned in one or more work flows in the flow chart and/or one or more blocks in the block diagram.

These computer program instructions may also be stored in a computer readable storage that may guide the computer or the other programmable data process devices to function in a certain way, so that the instructions stored in the computer readable storage may create a product including an instruction unit which achieves the functions assigned in one or more flows in the flow chart and/or one or more blocks in the block diagram.

These computer program instructions may also be loaded in the computer or the other programmable data process devices, so that a series of operation steps are executed on the computer or the other programmable devices to create processes achieved by the computer. Therefore, the instructions executed in the computer or the other programmable devices provide the steps for achieving the function assigned in one or more flows in the flow chart and/or one or more blocks in the block diagram.

Although the preferred embodiments are described above, a person skilled in the art may make modifications and alterations to these embodiments in accordance with the basic concept of the present disclosure. So, the attached claims are intended to include the preferred embodiments and all of the modifications and alterations that fall within the scope of the present disclosure.

It is appreciated that those skilled in the art may modify and improve the present disclosure without departing from the spirit and principle of the present disclosure. As a result, if those modification and improvement falls within the scope of claims and the equivalence thereof, those modification and improvement fall within the scope of the present disclosure.

What is claimed is:

1. A Device-to-Device (D2D) communication method for D2D communication by using an authorized Time Division Duplexing (TDD) carrier, comprising:

in the case that a first user equipment (UE) determines that no cell has been detected:

obtaining, by the first UE, a TDD uplink and downlink configuration and a D2D resource configuration strategy for resource configuration in the case that the first UE determines that no cell has been detected;

allocating, by the first UE, resources for a first phase of the D2D communication based on the TDD uplink and downlink configuration and the D2D resource configuration strategy; and performing, by the first UE, the first phase of the D2D communication based on the allocated resources for the first phase of the D2D communication;

wherein the obtaining by the first UE the TDD uplink and downlink configuration and D2D resource configuration strategy for the resource configuration comprises:

obtaining, by the first UE, the TDD uplink and downlink configuration which is preconfigured for the first UE and the D2D resource configuration strategy which is preconfigured for the first UE, in the case that the first UE has not received a synchronization signal transmitted by a second UE; or stopping, by the first UE, a current transmission of a D2D signal, wherein the current transmission of the D2D signal uses the TDD uplink and downlink configuration which is preconfigured for the first UE and the D2D resource configuration strategy which is preconfigured for the first UE, and using, by the first UE, the TDD uplink and downlink configuration and a D2D resource configuration strategy of a second UE as the TDD uplink and downlink configuration and the D2D resource configuration strategy for the resource configuration, in the case that the first UE has received a synchronization signal transmitted by the second UE within a first predetermined time period, and a priority of the synchronization signal transmitted by the second UE is higher than a priority of a synchronization signal transmitted by the first UE;

in the case that the first UE has detected a cell at a TDD frequency point authorized for the D2D communication and the first UE camps on the cell after the first UE has performed the first phase of the D2D communication based on the allocated D2D resources, the method further comprising:

stopping, by the first UE, the current transmission of the D2D signal, and allocating, by the first UE, resources for a second phase of the D2D communication based on TDD uplink and downlink configuration of the cell where the first UE camps on and a D2D resource pool obtained from a system message broadcasted by the cell, and transmitting, by the first UE, the D2D signal based on the allocated D2D resources for the second phase of the D2D communication.

2. The method according to claim 1, wherein the allocating by the first UE the resources for the first phase of the D2D communication based on the TDD uplink and downlink configuration and the D2D resource configuration strategy comprises:

determining, by the first UE, a transmitting sub-frame time pattern indicating a transmitting sub-frame for the first phase of the D2D communication based on the TDD uplink and downlink configuration and the D2D resource configuration strategy; and determining, by the first UE, transmitting resources for the first phase of the D2D communication based on the transmitting sub-frame time pattern.

3. The method according to claim 1, further comprising:

in the case that the first UE is out of synchronization in a first cell where the first UE camps on, and the first UE has detected a second cell at the TDD frequency point authorized for the D2D communication within a second predetermined time period and the first UE camps on the second cell, stopping, by the first UE, the current transmission of the D2D signal and allocating, by the first UE, resources for the second phase of the D2D communication based on TDD uplink and downlink configuration of the second cell and the D2D resource pool obtained from a system message broadcasted by the second cell, and transmitting, by the first UE, the D2D signal based on the allocated D2D resources for the second phase of the D2D communication.

4. The method according to claim 1, further comprising:

in the case that the first UE is out of synchronization in the cell where the first UE camps on, the first UE has not detected any other cell within a second predetermined time period, and the first UE has received a synchronization signal transmitted by a third UE at the TDD frequency point authorized for the D2D communication, stopping, by the first UE, the current transmission of the D2D signal, allocating, by the first UE, resources for the first phase of the D2D communication by using TDD uplink and downlink configuration and a D2D resource configuration strategy of the third UE, and transmitting, by the first UE, the D2D signal based on the allocated D2D resources for the first phase of the D2D communication.

5. The method according to claim 1, further comprising:

in the case that the first UE is out of synchronization in the cell where the first UE camps on, the first UE has not detected any other cell within a second predetermined time period, and the first UE has not received a synchronization signal transmitted by a third UE at the TDD frequency point authorized for the D2D communication, allocating, by the first UE, resources for the first phase of the D2D communication based on the TDD uplink and downlink configuration which is preconfigured for the first UE and the D2D resource configuration strategy which is preconfigured for the first UE, and performing, by the first UE, the first phase of the D2D communication based on the allocated D2D resources for the first phase of the D2D communication after a third predetermined time period.

6. A Device-to-Device (D2D) communication apparatus for D2D communication by using an authorized Time Division Duplexing (TDD) carrier, comprising a processor, and a memory connected to the processor via a bus interface and configured to store therein programs and data for the operation of the processor, wherein in the case that no cell has been detected, the processor is configured to achieve:

an obtaining circuit, configured to obtain a TDD uplink and downlink configuration and a D2D resource configuration strategy for resource configuration;

a D2D resource allocating circuit, configured to allocate resources for a first phase of the D2D communication based on the TDD uplink and downlink configuration and the D2D resource configuration strategy; and a communication circuit, configured to perform the first phase of the D2D communication based on the allocated resources for the first phase of the D2D communication;

wherein the obtaining circuit is further configured to:
obtain the TDD uplink and downlink configuration which is preconfigured for a first UE and the D2D resource configuration strategy which is preconfigured for the first UE, in the case that the first UE has not received a synchronization signal transmitted by a second UE; or
stop, by a first UE, current transmission of a D2D signal,
wherein the current transmission of the D2D signal uses the TDD uplink and downlink configuration which is preconfigured for the first UE and the D2D resource configuration strategy which is preconfigured for the first UE, and use, by the first UE, the TDD uplink and downlink configuration and a D2D resource configuration strategy of a second UE as the TDD uplink and downlink configuration and the D2D resource configuration strategy for the resource configuration, in the case that the first UE has received a synchronization signal transmitted by the second UE within a first predetermined time period, and a priority of the synchronization signal transmitted by the second UE is higher than a priority of a synchronization signal transmitted by the first UE;
wherein in the case that the first UE has detected a cell at a TDD frequency point authorized for the D2D communication and the first UE camps on the cell after the first UE has performed the first phase of the D2D communication based on the allocated D2D resources, the communication circuit is configured to:
stop, by the first UE, the current transmission of the D2D signal, and allocate resources for a second phase of the D2D communication based on the TDD uplink and downlink configuration of the cell where the first UE camps on and a D2D resource pool obtained from a system message broadcasted by the cell, and transmit, by the first UE, the D2D signal based on the allocated D2D resources for the second phase of the D2D communication.

7. The apparatus according to claim 6,
wherein the D2D resource allocating circuit is configured to:
determine, by the first UE, a transmitting sub-frame time pattern indicating a transmitting sub-frame for the first phase of the D2D communication based on the TDD uplink and downlink configuration and the D2D resource configuration strategy; and
determine, by the first UE, transmitting resources for the first phase of the D2D communication based on the transmitting sub-frame time pattern.

8. The apparatus according to claim 6,
wherein in the case that the first UE is out of synchronization in a first cell where the first UE camps on, and the first UE has detected a second cell at the TDD frequency point authorized for the D2D communication within a second predetermined time period and the first UE camps on the second cell, the communication circuit is configured to:
stop, by the first UE, the current transmission of the D2D signal, and
allocate resources for the second phase of the D2D communication based on TDD uplink and downlink configuration of the second cell and the D2D resource pool obtained from a system message broadcasted by the second cell, and transmit, by the first UE, the D2D signal based on the allocated D2D resources for the second phase of the D2D communication.

9. The apparatus according to claim 6,
wherein in the case that the first UE is out of synchronization in the cell where the first UE camps on, the first UE has not detected any other cell within a second predetermined time period, and the first UE receives a synchronization signal transmitted by a third UE at the TDD frequency point authorized for the D2D communication the communication circuit is configured to:
stop, by the first UE, the current transmission of the D2D signal,
allocate, by the first UE, resources for the first phase of the D2D communication by using TDD uplink and downlink configuration and a D2D resource configuration strategy of the third UE, and
transmit, by the first UE, the D2D signal based on the allocated D2D resources for the first phase of the D2D communication.

10. The apparatus according to claim 6,
wherein in the case that the first UE is out of synchronization in the cell where the first UE camps on, the first UE has not detected any other cell within a second predetermined time period, and the first UE has not received a synchronization signal transmitted by a third UE at the TDD frequency point authorized for the D2D communication the communication circuit is configured to:
allocate, by the first UE, resources for the first phase of the D2D communication based on the TDD uplink and downlink configuration which is preconfigured and the D2D resource configuration strategy which is preconfigured for the first UE, and perform, by the first UE, the first phase of the D2D communication based on the allocated D2D resources for the first phase of the D2D communication after a third predetermined time period.

11. A Device-to-Device (D2D) communication apparatus, comprising:
a processor;
a memory connected to the processor via a bus interface and configured to store therein programs and data for the operation of the processor,
wherein in the case that the programs and data stored in the memory are called and executed by the processor and in the case that no cell has been detected, the processor is configured to achieve steps of:
obtaining a Time Division Duplexing (TDD) uplink and downlink configuration and a D2D resource configuration strategy for resource configuration;
allocating resources for a first phase of the D2D communication based on the TDD uplink and downlink configuration and the D2D resource configuration strategy; and
performing the first phase of the D2D communication based on the allocated resources for the first phase of the D2D communication;
wherein the obtaining a Time Division Duplexing (TDD) uplink and downlink configuration and a D2D resource configuration strategy for resource configuration-in comprises:
obtaining, by a first UE, the TDD uplink and downlink configuration which is preconfigured for the first UE and the D2D resource configuration strategy which is preconfigured for the first UE, in the case that the first UE has not received a synchronization signal transmitted by a second UE; or stopping, by a first UE, a current transmission of a D2D signal,
wherein the current transmission of the D2D signal uses the TDD uplink and downlink configuration which is preconfigured for the first UE and the D2D resource configuration strategy which is preconfigured for the first UE, and using, by the first UE, the TDD uplink and downlink configuration and a D2D resource configuration strategy of a second UE as the TDD uplink and downlink configuration and the D2D resource configuration strategy for the resource configuration, in the case that the first UE has received a synchronization signal transmitted by the second UE within a first predetermined time period, and a priority of the synchronization signal transmitted by the second UE is higher than a priority of a synchronization signal transmitted by the first UE;
wherein in the case that the first UE has detected a cell at a TDD frequency point authorized for the D2D communication and the first UE camps on the cell after the first UE has performed the first phase of the D2D communication based on the allocated D2D resources, the processor is configured to achieve steps of
stopping, by the first UE, the current transmission of the D2D signal, and allocating, by the first UE, resources for a second phase of the D2D communication based on TDD uplink and downlink configuration of the cell where the first UE camps on and a D2D resource pool obtained from a system message broadcasted by the cell, and transmitting, by the first UE, the D2D signal based on the allocated D2D resources for the second phase of the D2D communication.

12. The apparatus according to claim 11,
wherein the allocating resources for the first phase of the D2D communication based on the TDD uplink and downlink configuration and the D2D resource configuration strategy comprises:
determining, by the first UE, a transmitting sub-frame time pattern indicating a transmitting sub-frame for the first phase of the D2D communication based on the TDD uplink and downlink configuration and the D2D resource configuration strategy; and
determining, by the first UE, transmitting resources for the first phase of the D2D communication based on the transmitting sub-frame time pattern.

13. The apparatus according to claim 11,
wherein in the case that the first UE is out of synchronization in a first cell where the first UE camps on, and the first UE has detected a second cell at the TDD frequency point authorized for the D2D communication within a second predetermined time period and the first UE camps on the second cell, the processor is configured to achieve steps of:
stopping, by the first UE, the current transmission of the D2D signal, and
allocating, by the first UE, resources for the second phase of the D2D communication based on TDD uplink and downlink configuration of the second cell and the D2D resource pool obtained from a system message broadcasted by the second cell, and
transmitting, by the first UE, the D2D signal based on the allocated D2D resources for the second phase of the D2D communication.

14. The apparatus according to claim 11,
wherein in the case that the first UE is out of synchronization in the cell where the first UE camps on, the first UE has not detected any other cell within a second predetermined time period, and the first UE has received a synchronization signal transmitted by a third UE at the TDD frequency point authorized for the D2D communication, the processor is configured to achieve steps of: stopping, by the first UE, the current transmission of the D2D signal, allocating, by the first UE, resources for the first phase of the D2D communication by using TDD uplink and downlink configuration and a D2D resource configuration strategy of the third UE, and transmitting, by the first UE, the D2D signal based on the allocated D2D resources the first phase of the D2D communication.

15. The apparatus according to claim 11,
wherein in the case that the first UE is out of synchronization in the cell where the first UE camps on, the first UE has not detected any other cell within a second predetermined time period, and the first UE has not received a synchronization signal transmitted by a third UE at the TDD frequency point authorized for the D2D communication, the processor is configured to achieve steps of allocating, by the first UE, resources for the first phase of the D2D communication based on the TDD uplink and downlink configuration which is preconfigured for the first UE and the D2D resource configuration strategy which is preconfigured for the first UE, and performing, by the first UE, the first phase of the D2D communication based on the allocated D2D resources for the first phase of the D2D communication after a third predetermined time period.

* * * * *